3,169,729
ATTITUDE CONTROL SYSTEM
Einar Godo, 17103 NE. 16th Place, Bellevue, Wash.
Filed Mar. 26, 1963, Ser. No. 268,175
3 Claims. (Cl. 244—76)

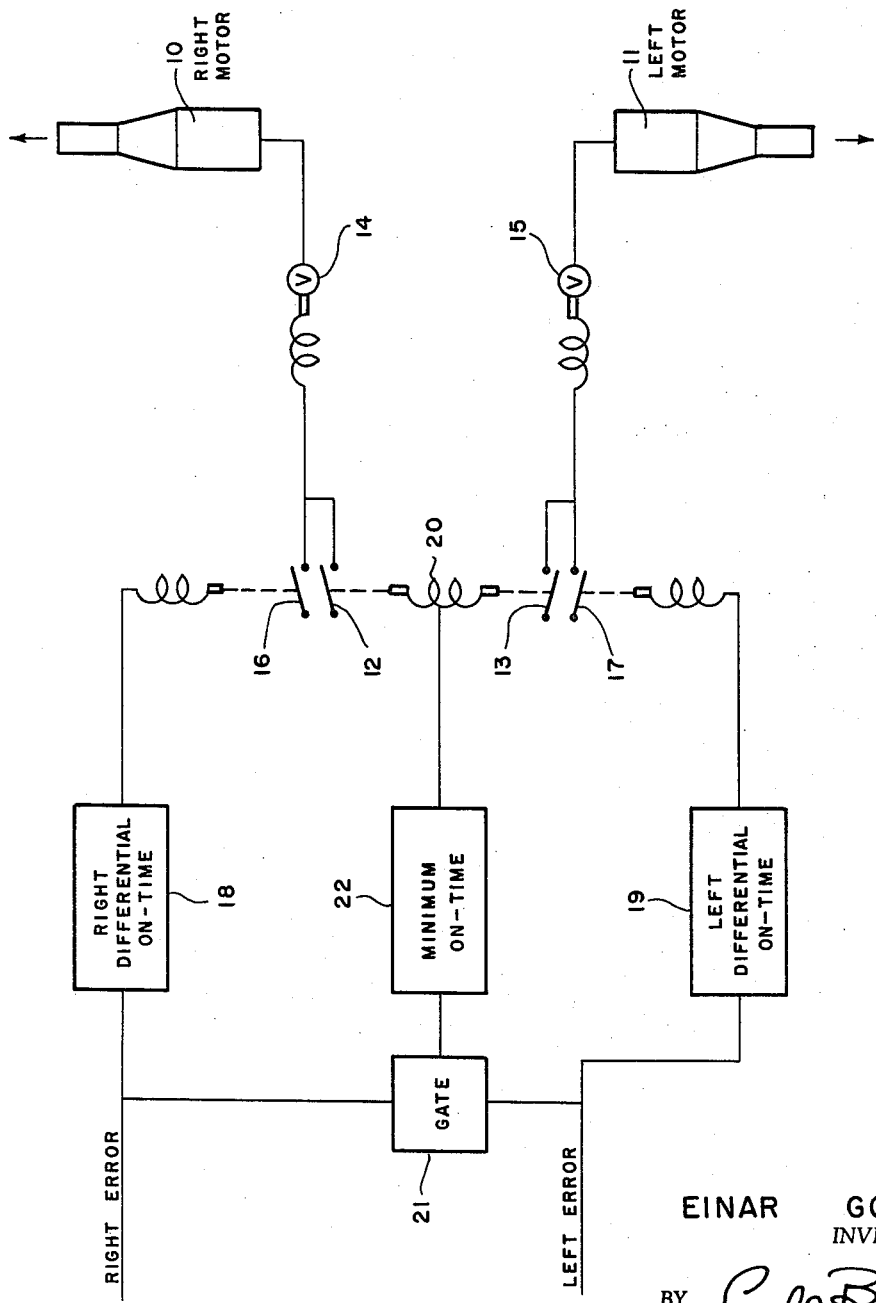

The present invention relates to an improved attitude control system for liquid fueled satellites or other space vehicles utilizing pairs of reaction motors arranged with their thrusts opposed for providing the required attitude correction torque about any desired vehicle axis. In the past the opposed jets have been operated in an on-off mode, and thus the control sensitivity has been limited by the minimum on-time limit of the motors. Since the thrust created during minimum on-time is often greater than that required for attitude correction, the resulting over-correction causes the period of oscillation of the space vehicle with respect to the concerned yaw, pitch or roll axis to be greater than desired for minimum operation of the thrust motors. Accordingly, minimum on-time of the motors has been the limiting factor in achieving minimum fuel consumption for attitude control.

The principal object of this invention is to provide a different mode of operation for each pair of opposed attitude-control jets giving increased control sensitivity whereby the oscillation period is so reduced that even though each thrust impulse may require greater fuel consumption than normally used in an on-off mode, the net fuel consumption for attitude stabilization will be significantly less.

The foregoing together with other objects and advantages will appear and be understood in the course of the following description and claims, the invention consisting in the novel construction and in the adaptation and combination of parts hereinafter described and claimed.

In the accompanying drawing the single figure is a schematic layout of an attitude control system embodying the present invention.

Continuing to a description of the invention, the jets of two like reaction motors 10–11 are conventionally arranged with their thrusts opposing one another, but instead of turning on only one of the motors at one of the crests or pulses of the oscillation cycle for the respective attitude axis and turning on the other motor at the other crest of the cycle both motors are turned on for each pulse. While the motors are both on, they of course have no effect on the space vehicle. However, since the cut-off of the motors beyond minimum on-time can be controlled to a substantially perfect degree, a smaller thrust differential can be created by turning on the reaction motors simultaneously and then turning off one of them ahead of the other, than can be obtained from a minimum on-time of just one of the motors. Such an on-time differential between the two opposed motors can also be made by turning on one of the motors ahead of the other by the on-time differential, and then turning them off together. In either case the difference in the total impulse exerted by the two motors due to the differential on-time gives a differential impulse which can be made to come very close to zero.

A manner of implementing such a differential on-time cycle is shown schematically in the drawing wherein it is seen that as soon as the error exceeds the dead band of the related rate sensor, solenoid 20 closes switches 12 and 13, thereby completing circuits to the solenoid valves 14–15 for respectively turning on the fuel to the two opposed thrust motors 10–11. At the same time one of the solenoid switches 16–17 is closed to keep the circuit to the respective motor closed after the solenoid 20 is de-energized. Assuming an attitude right-error for purposes of example, the resulting signal causes a simultaneous closing of switches 12, 13 and 16, the signal being isolated by the gate 21 from the solenoid switch 17. The solenoid 20 is then deenergized with minimum on-time by the digital clock 22 thereby turning off the left motor 11 at minimum on-time. Meanwhile the right motor is kept on by the switch 16 until the digital clock 18 opens the circuit after expiration of a time differential, in excess of said minimum on-time, which is proportional to the attitude right-error. Similary if there is a left-error the gate 21 isolates switch 16 from the signal and switch 17 keeps the left motor 11 on after shut-off of the right motor 10 until digital clock 19 indicates the proper on-time differential for correction. A computer can be readily programmed to this thrust differential programing.

As before indicated, the differential on-time concept of the present invention is particularly useful for space flights in which minimum fuel consumption is an important factor. However, it is also very useful for space flights wherein high accuracy of attitude control is the more important requirement. In either instance implementation of the present invention is so simple that it can be used on almost any space vehicle without any weight penalty.

It is believed that the invention will have been clearly understood from the foregoing detailed description of my illustrated now preferred embodiment. Minor changes in the details of construction will suggest themselves and I accordingly intend that no limitations be implied and that the hereto annexed claims be given a scope fully commensurate with the broadest interpretation which the employed language fairly admits.

What I claim is:

1. In combination, a pair of opposed thrust motors mounted on a space vehicle at a lever distance from a given attitude axis, said motors having a given on-time, means responsive to a given attitude error for turning said motors on and off with overlapping on-times of different durations, the period of overlap being at least as long as said given minimum on-time and the difference between the non-overlapping portions of said on-times being proportional to said error, the thrust motor which exerts its thrust in the direction for correcting said error having the longer on-time.

2. In combination, a pair of opposed thrust motors mounted on a space vehicle at a lever distance from a given attitude axis, said motors having a given minimum on-time, means responsive to a given attitude error for turning said motors on and off with overlapping on-times of different durations, the turn-off point of both said motors being at one end of the overlap of their on-times, and the difference between the on-times being proportional to said error, the thrust motor which exerts its thrust in the direction for correcting said error having the longer on-time.

3. In combination, a pair of opposed thrust motors mounted on a space vehicle at a lever distance from a given attitude axis, said motors having a given minimum on-time, means responsive to a given attitude error for turning said motors on simultaneously, means for turning off at said given minimum on-time the motor which exerts its thrust in correspondence with said error, and means for turning off the other motor at an on-time differential in excess of said minimum on-time which is proportional to said error.

No references cited.